United States Patent Office 3,523,864
Patented Aug. 11, 1970

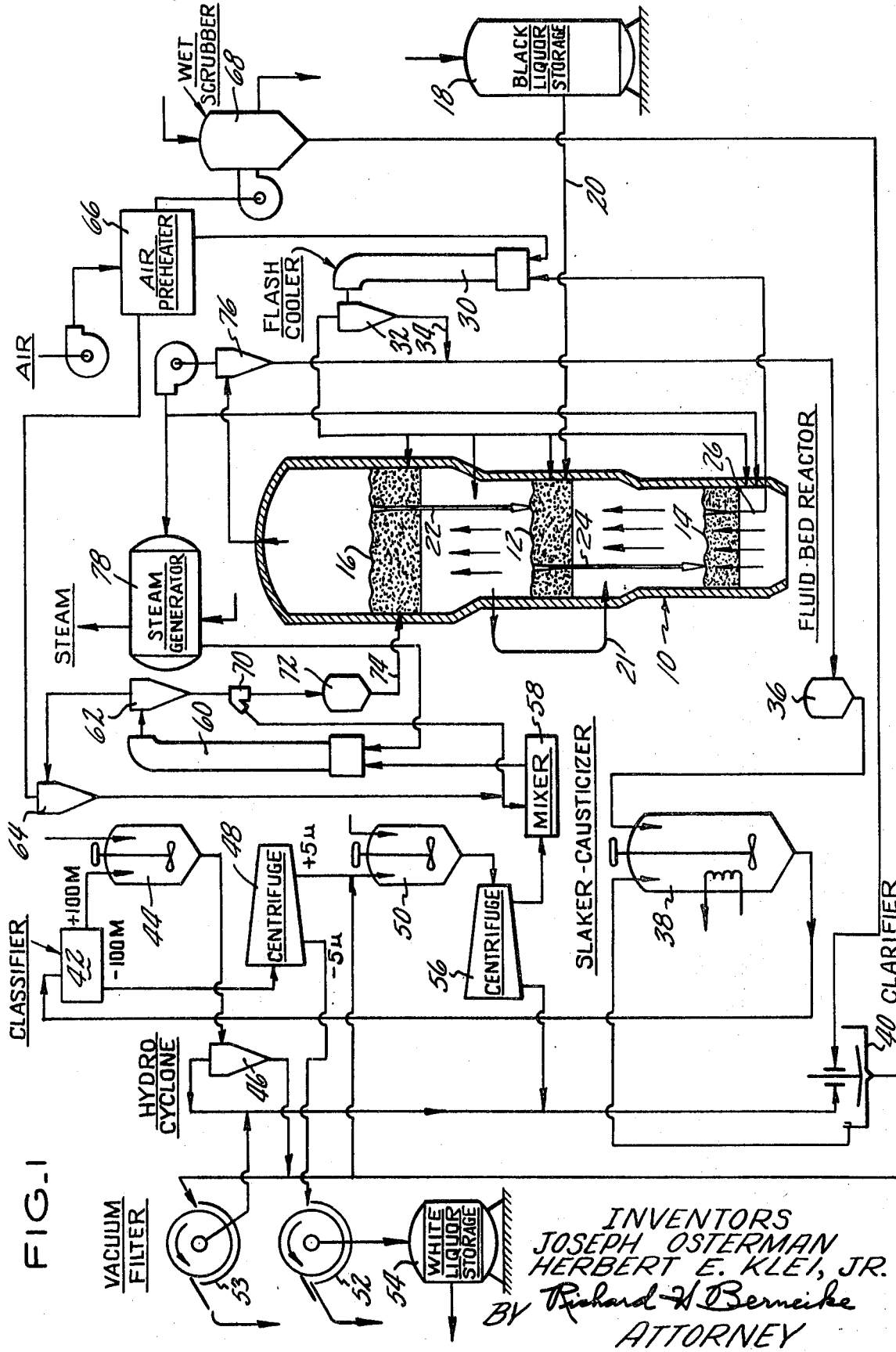

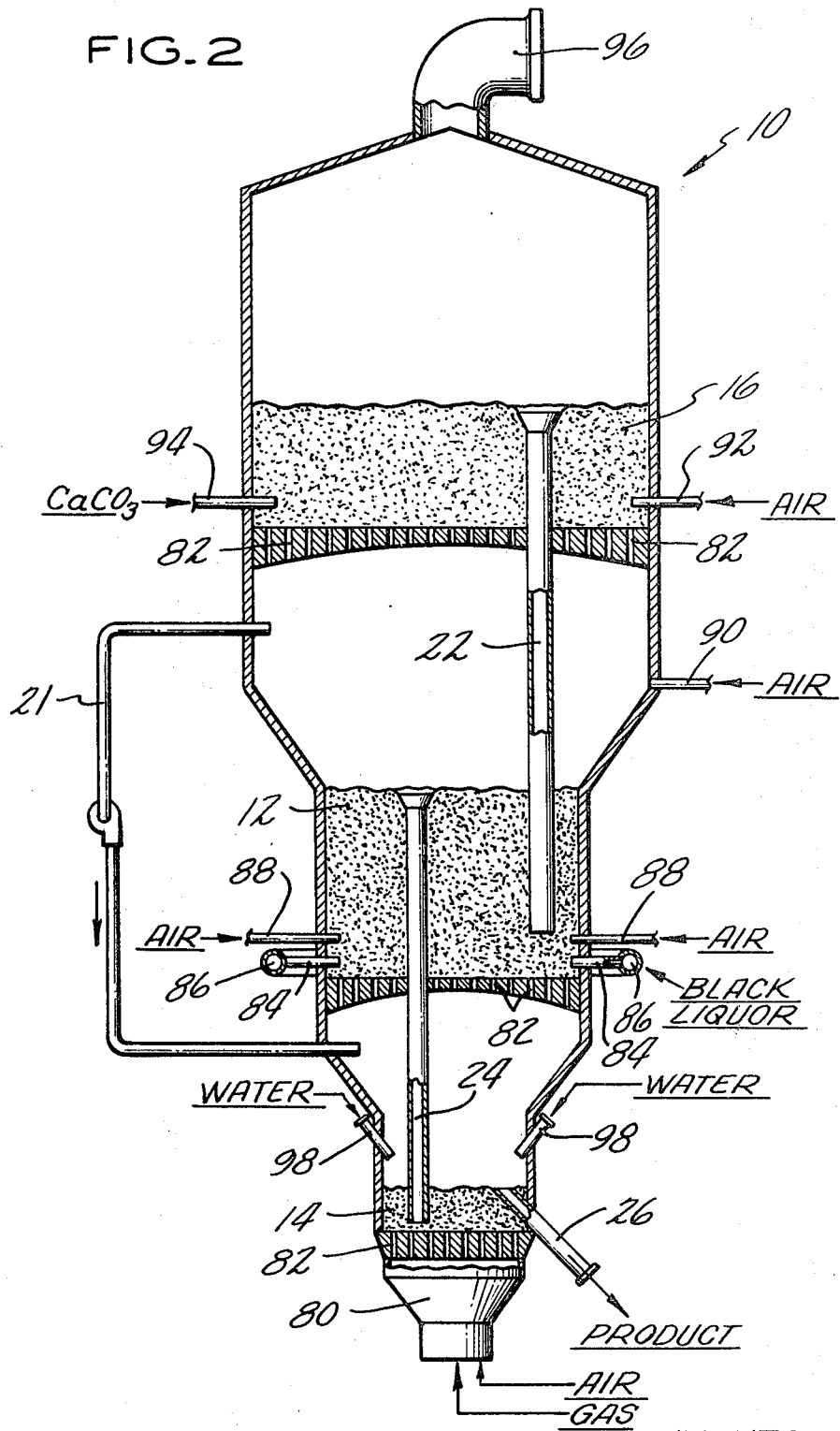

3,523,864
PAPER PULPING CHEMICAL RECOVERY SYSTEM
Joseph Osterman, Simsbury, and Herbert E. Klei, Jr., Willington, Conn., assignors to Combustion Engineering, Inc., Windsor, Conn., a corporation of Delaware
Filed Dec. 28, 1967, Ser. No. 694,335
Int. Cl. D21c 11/12
U.S. Cl. 162—30                                       10 Claims

ABSTRACT OF THE DISCLOSURE

A recovery systvem for kraft process black liquor including a three zone fluidized bed reactor in which the black liquor is dried and oxidized in the intermediate zone, the inorganic sodium and sulfur compounds are reduced in the bottom zone, and calcium carbonate is calcined to form calcium oxide in the top zone. The fluidized beds are formed essentially of calcium oxide particles or pellets, which overflow from the top bed into the intermediate bed where they are coated by the black liquor. From this intermediate bed the now coated particles overflow into the bottom bed and finally the agglomerate particles or pellets are transferred to a slaker-causticizer tank.

BACKGROUND OF THE INVENTION

The present invention relates to the processing and recovery of chemicals from the black liquor discharged from a kraft process paper pulp digestion system.

In conventional kraft chemical recovery systems, the weak black liquor from the pulping operation is first concentrated in evaporators to produce a strong black liquor which is perhaps 65% by weight solids. This strong black liquor is then introduced into a chemical recovery furnace in which the combustibles (organic compounds removed from the wood chips) in the liquor are oxidized. These combustible compounds in the black liquor are oxidized to yield combustion gases, water, and heat. The heat from this combustion reaction is absorbed in the boiler section of the furnace to produce process steam. The remaining black liquor, which contains primarily sodium sulfate and sodium carbonate, is dried and settled to the bottom of the furnace into a smelt pool where burning continues and reduction takes place to convert the sodium sulfate to sodium sulfide. The smelt is drained from the smelt bed to a dissolving tank where it is dissolved to form green liquor. From there the green liquor flows to a causticizing system where calcium hydroxide is added to convert the sodium carbonate to sodium hydroxide which remains in solution in the resulting white liquor and to precipitate calcium carbonate which must be removed from the white liquor to form fresh cooking liquor. The remaining white liquor contains sodium hydroxide and sodium sulfide in the correct proportions for efficient digestion of wood chips. The calcium carbonate removed from the white liquor is washed and then calcined in a separately fired rotary lime kiln. The calcium oxide from the kiln is then slaked to form calcium hydroxide and used in the causticizer. A typical flow diagram of the kraft paper making process employing such a chemical recovery system is illustrated following page 27-6 in Combustion Engineering, Revised Edition, 1966, by Glenn R. Fryling.

SUMMARY OF THE INVENTION

The present invention proposes to substitute a multi-zoned fluid bed reactor for the chemical recovery furnaces and lime kiln of the prior art which, in turn, will tend to simplify the causticizing system. A further object of the present invention is to accomplish the calcining operation in one of the fluidized bed reactor zones utilizing the heat generated by the black liquor oxidation rather than carrying out the calcining operation in a separate fuel fired kiln as in the prior art. Many other objects and advantages of the present invention will be readily apparent from the detailed description which follows.

BRIEF DESCRIPTION OF THE DRAWINGS

FIG. 1 is a process flow diagram of the recovery system of the present invention.

FIG. 2 is a more detailed illustration of a fluidized bed reactor of the invention.

DESCRIPTION OF THE PREFERRED EMBODIMENT

Referring first to FIG. 1, there is illustrated a fluidized bed reactor 10 which has therein three fluidized beds 12, 14 and 16. These fluidized beds divide the reactor into three zones, namely an intermediate drying and combustion zone; a lower reducing zone; and an upper, afterburner and calcining zone.

Strong black liquor from the evaporators which has been concentrated to perhaps 40–65% solids is stored in tank 18 and fed therefrom through line 20 to burners which inject the black liquor into the intermediate fluidized bed 12. Preheated combustion air is also introduced into this intermediate fluidized bed to dry the liquor and to carry out a partial combustion reaction which involves the burning of the ligneous and other carbonaceous materials in the black liquor to form gaseous partial combustion products and water vapor. This air may be on the order of 30% of that required for complete combustion. The temperature in this combination bed will be on the order of 1200–1300° F. and sufficient heat will be available to sustain the rapid drying of the residual moisture in the black liquor. The additional required combustion air may be admitted in the space above bed 12 and into the lower reducing bed as will be explained hereinafter.

The combustion gases and unoxidized organics from the intermediate fluid bed 12 rise upwardly within the reactor through the combustion zone between the intermediate and upper beds and are further oxidized. At least a portion of the gases then enters the upper fluidized bed 16 with the remainder being recirculated through the intermediate bed 12 via line 21. The gases are recirculated in order to supply additional drying and oxidizing heat to the intermediate bed 12. The amount of gas recirculated may be rigulated to maintain the proper condition in bed 12. Additional combustion air may also be admitted into the upper bed 16 to complete the oxidation reactions. The temperature in this upper bed is on the order of 1700–1800° F. Pre-dried $CaCO_3$, the source of which will be explained hereinafter, is introduced into the upper fluidized bed 16 by a feeder 74. The heat from the combustion gases and continuing oxidation in fluidized bed 16 calcines the $CaCO_3$ in an endothermic reaction to produce CaO pellets. These CaO pellets form the fluidized beds in the reactor and they overflow through the conduits 22 and 24 from one bed to another. These CaO pellets also act as nuclei which are coated with and transport the $Na_2CO_3$ and the $Na_2SO_4$ from the intermediate bed through the conduit 24 to the lower reducing fluidized bed 14.

The temperature in the reducing fluidized bed 14 is lower than the melting point of the conglomerate pellets or on the order of 1300–1400° F. In this bed, the $Na_2SO_4$ is reduced to yield $Na_2S$. The reactions involved are as follows:

$$Na_2SO_4 + 4C \rightarrow Na_2S + 4CO$$
$$Na_2SO_4 + 4CO \rightarrow Na_2S + 4CO_2$$

The solid reaction products in pellet form from the lower reducing bed are removed through conduit 26 with withdrawn from the fluidized bed reactor.

Carbon is an undesirable impurity in the

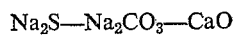

reducing bed product since it may carry over into the cooking liquor. For this reason, air is passed upwardly through the lower bed to oxidize the carbon to CO and $CO_2$ and also to act as the fluidizing gas. Combustion gases from the top of the fluidized bed reactor may optionally be recirculated to the bottom of the reactor to act as a fluidized medium in addition to the air. The exothermic reactions involved could raise the temperature in the reducing bed above the melting point of the $Na_2CO_3$—NaS mixture and cause the loss of sodium and sulfur. To avoid these high temperatures, water may be sprayed onto the reducing bed in addition to cooling the entering gases.

The reaction products are next fed to a flash cooler 30 in which the heat is extracted from the reaction products by direct contact with air so as to preheat the air for introduction into the fluidized bed reactor as previously mentioned. The reaction products are carried by the heated air from the cooler 30 to a cycline separator 32 wherein the air and reaction products are separated. The reaction products are carried from the cyclone separator 32 through line 34 to storage bin 36.

The reaction products from the storage bin are next fed to a mechanically agitated slaker-causticizer 38 and mixed with makeup water and/or weak white liquor obtained from clarifier 40 which will be further explained hereinafter. The following reactions take place in the slaker-causticizer:

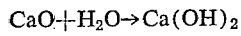

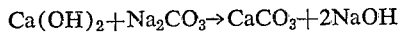

The $CaCO_3$ formed in the slaker-causticizer 38 is substantially insoluble in the liquid which now contains the NaOH and $Na_2S$. This solution, after removal of $CaCO_3$, is what is known in the art as white cooking liquor. The white liquor slurry, which also contains other waste solids, is withdrawn from the slaker-causticizer 38 and passed to a classifier 42. In the classifier 42, the solids entrained in the white liquor are separated into two size fractions, one containing particles largely less than 100 mesh and including substantially all of the $CaCO_3$ and the other fraction containing particles larger than 100 mesh and including a substantial portion of the waste solid materials. The portion containing the larger particles and the majority of the waste is fed to a mixing tank 44 in which the solids are washed with fresh water and passed therefrom to a hydrocyclone 46. In the hydrocyclone the solid waste products are at least partially separated from the weak white liquor. The weak white liquor from the hydrocyclone is fed to the clarifier 40.

The products from the classifier 42 containing the smaller particles which include substantially all of the $CaCO_3$ are fed to a solid bowl centrifuge 48. In this centrifuge the solids are again classified into fractions containing particles larger than and smaller than approximately five microns. The fraction containing the larger particles contains substantially all of the $CaCO_3$ and is fed from the centrifuge 48 to the mixing tank 50. The portion from centrifuge 48 containing the smaller particles, which are substantially all waste materials together with the majority of the white liquor, is polished by a vacuum precoat filter 52. Filter 52 is precoated with deslimed $CaCO_3$ or raw makeup powdered limestone. A second vacuum precoat filter 53 is employed to treat the sludge from the bottom of the hydrocyclone 46 as well as the sludge from the clarifier 40. The sludge from the clarifier 40 may alternately be fed to the filter 52. The vacuum precoat filter 52 separates the remaining $CaCO_3$ and other solids from the white liquor which then becomes finished cooking liquor which is passed to storage tank 54 for subsequent use in the pulp digestion process. The vacuum precoat filter 53 removes the solid impurities from the system as a relatively dry cake while polishing the weak liquor passing to the clarifier 40. Clarifier 40 may be designed with storage volume for weak liquor.

The wet $CaCO_3$ which has been passed from the centrifuge 48 to the mixing tank 50 is mixed with fresh water for washing and then passes to another centrifuge 56. In this centrifuge the $CaCO_3$ is separated from the liquid which is now a weak cooking liquor and is passed to a paddle mixer 58. The weak liquor from the centrifuge 56 is passed to the clarifier 40 along with the weak liquor from the hydrocyclone 46 and the vacuum precoat filter 53.

In the paddle mixer 58 the wet $CaCO_3$ cake from the centrifuge 56 is mixed with dry $CaCO_3$ and passed to a flash drier 60 in which the wet $CaCO_3$ is dried by direct contact with hot gases. The dried $CaCO_3$ from the flash drier is passed to a pair of cyclones 62 and 64 in series wherein the dried $CaCO_3$ is stripped from the gas stream. The gases from the cyclone 64 are fed to the air preheater 66 in which the incoming drying and combustion air being fed to the cooler 30 is heated. The cooled gases emerging from the air preheater 66 may contain some $CaCO_3$ dust and they are therefore scrubbed in the wet scrubber 68. The liquid from the wet scrubber is then recycled to the clarifier 40.

The $CaCO_3$ from the cyclone 62 is split into two portions by a splitter 70 with a portion being recycled to the paddle mixer 58 along with the dried $CaCO_3$ from the cyclone 64. The remainder of the dried $CaCO_3$ from the splitter 70 is fed to a storage bin 72. The $CaCO_3$ is then conveyed from the bin 72 by a feeder 74 to the upper fluidized bed 16 in the reactor where the $CaCO_3$ is calcined to CaO.

The combustion gases, together with any entrained solids such as CaO which exit from the top of the fluidized bed reactor are fed to a cyclone separator 76 wherein the solids are separated and fed to the storage bin 36 together with the reaction products from the bottom of the fluidized bed reactor which have been passed through the cooler 30. The combustion gases from the cyclone 76 which are not fed to the bottom of the reactor as fluidizing gas are fed to a steam generator 78 wherein the latent heat in the gases is employed to generate steam. The exhaust gases from the steam generator 78 are employed as the drying medium in the flash drier 60 and subsequently as the heating medium in the air preheater 66.

FIG. 2 illustrates the fluidized bed reactor 10 in more detail. The reactor is lined with fire brick throughout except for the gas inlet duct 80 at the lower end of the reactor. The fluidized beds 12, 14 and 16 are supported in the reactor by means of the constriction plates 82 which have holes extending vertically therethrough. These constriction plate holes serve as nozzles for the gas flowing upwardly through the reactor. The overflow conduits 22 and 24 serve to pass the excess materials from one fluidized bed downwardly to the succeeding fluidized bed. The positions of these overflow conduits may be adjustable if desired in order to regulate the depth of each of the fluidized beds. As an alternative, the overflow conduits may be valved to control the rate of transfer and thus the depth of the beds. The material is withdrawn from each of the fluidized beds and introduced into the next fluidized bed in a manner to obtain the best flow pattern and residence time for the materials.

The black liquor from the storage tank 18 is introduced into the intermediate fluidized bed 12 by means of the burned nozzles 84. These burner nozzles may be located at frequent intervals around the circumference of the reactor and connected together by means of a manifold 86. Combustion air is also introduced into the intermediate bed 12 by means of the nozzles 88 which may also be located at frequent intervals around the circumference of the reactor. Additional combustion air is introduced into the zone above the intermediate fluidized bed and into the upper fluidized bed by means of the nozzles 90 and 92 respectively. The number and location of these nozzles may also be as desired and necessary. Gases from the zone above the intermediate bed may be recirculated through the bed via line 21.

The dried $CaCO_3$ may be introduced into the upper fluidized bed 16 by means of nozzles 94 which should also be located at frequent intervals around the reactor and connected by a feed manifold. The combustion gases exit the reactor through the nozzle 96. The gases which are recirculated to the fluidized bed reactor as a fluidizing gas medium are introduced into the reactor through the duct 80 at the lower end. These gases would contain at least sufficient air or oxygen to burn the carbon out of the reaction products in the lower bed 14 as previously discussed. The reaction products are withdrawn from the lower bed 14 by means of conduit 26. The water which may be employed to cool the lower fluidized bed 14 as previously discussed is introduced into the reactor and on to the bed by means of nozzles 98.

Most of the advantages of the present invention are readily apparent from the above description. The primary advantage lies in combining the black liquor combustion and the $CaCO_3$ calcining, thus eliminating the need for a separate lime kiln and supplementary fuel supply. Also, with the present invention, it is possible to use a weaker black liquor to eliminate the costly evaporators used for obtaining higher black liquor concentrations necessary for conventional furnaces. A further advantage of the present invention lies in the elimination of liquid smelt (and thereby the safety hazards associated with liquid smelt) and in combining the dissolving, slaking, and causticizing operations. This eliminates the separate green liquor system employed in prior art with the consequent reduction in the number of separate vessels and liquid transfer operations associated with these processes.

While a preferred embodiment of the invention has been shown and described, it will be understood that such showing is merely illustrative and that changes may be made without departing from the spirit and scope of the invention as claimed.

We claim:

1. A process for treating waste pulping liquors containing organic materials and $Na_2SO_4$ and $Na_2CO_3$ comprising introducing said liquor and oxygen into a first fluidized bed formed of CaO pellets wherein said liquor is deposited on said pellets and dried and said organic materials are at least partially oxidized producing hot gaseous products, conducting at least a portion of said hot gaseous products to a second fluidized bed, introducing $CaCO_3$ into said second fluidized bed, said hot gaseous products converting said $CaCO_3$ to CaO pellets which form said second fluidized bed, conducting excess CaO pellets formed in said second fluidized bed to said first fluidized bed thereby forming said first fluidized bed, conducting excess CaO pellets with said $Na_2SO_4$ and $Na_2CO_3$ deposited on said pellets from said first fluidized bed to a third fluidized bed, passing a fluidizing gas medium up through said third fluidized bed and maintaining a reducing atmosphere and temperature in said third fluidized bed whereby said $Na_2SO_4$ is reduced to $Na_2S$, conducting a mixture of said CaO pellets and $Na_2CO_3$ and $Na_2S$ deposited on said pellets from said third fluidized bed to a slaker-causticizer, adding water to said mixture whereby a solution of NaOH and $Na_2S$ is formed and $CaCO_3$ is precipitated, separating said $CaCO_3$ from said solution, drying said separated $CaCO_3$, said dried $CaCO_3$ constituting said $CaCO_3$ introduced into said second fluidized bed, said solution of NaOH thereby being available for reuse as fresh pulping liquor.

2. A process for treating waste pulping liquors containing combustible organics and sulfates and carbonates in a fluidized bed reactor system containing three fluidized beds to recover chemicals for reuse in the pulping process wherein said fluidized beds are formed primarily of CaO particles comprising introducing said waste pulping liquor into a first one of said fluidized beds, introducing an oxygen-containing gas into said first fluidized bed and maintaining a temperature therein whereby at least a portion of said combustible organics are oxidized to yield gaseous products, conducting said gaseous products to a second of said fluidized beds, introducing $CaCO_3$ into said second fluidized bed wherein said $CaCO_3$ is calcined to said CaO particles which form said fluidized beds, conducting excess CaO particles formed in said second fluidized bed to said first fluidized bed, conducting excess CaO particles with said sulfates and said carbonates deposited on said particles from said first fluidized bed to a third of said fluidized beds, passing fluidizing gas medium successively up through said third and first and second fluidized beds, maintaining a temperature and gas composition in said third fluidized bed to cause reduction of said sulfates to sulfides, conducting said CaO particles with said sulfides and carbonates deposited on said particles from said third fluidized bed to a slaker-causticizer, adding water to said sulfides and carbonates and CaO in said slaker-causticizer to convert said carbonates to hydroxides and to dissolve said sulfides and hydroxides and precipitate $CaCO_3$, removing said precipitated $CaCO_3$ from said dissolved sulfides and hydroxides and feeding said $CaCO_3$ to said second fluidized bed, said dissolved sulfides and hydroxides thereby being available for reuse in said pulping process.

3. A process as recited in claim 2 and further including the step of introducing additional oxygen-containing gas into said gaseous products between said first and second fluidized beds to further oxidize said combustible organics.

4. A process as recited in claim 3 wherein said fluidizing gas medium includes an oxygen-containing gas whereby said fluidizing gas medium oxidizes combustible organics in said third fluidized bed.

5. A process as recited in claim 4 and further including the step of spraying water on said third fluidized bed to reduce the temperature thereof.

6. A process as recited in claim 4 and further including the step of withdrawing a portion of the gaseous products from between said first and second fluidized beds and conducting said portion up through said first fluidized bed.

7. A process as recited in claim 2 wherein said three fluidized beds are contained within a single vessel and wherein said second fluidized bed is on the top, said third fluidized bed is on the bottom, and said first fluidized bed is intermediate said second and third fluidized beds.

8. A process as recited in claim 2 and further including the step of drying said removed precipitated $CaCO_3$ prior to introduction into said second fluidized bed.

9. A process as recited in claim 2 and further including the step of withdrawing hot gaseous products from above said second fluidized bed and recovering heat from at least a portion thereof.

10. A process as recited in claim 9 wherein said fluidizing gas medium includes another portion of said hot gaseous products from above said second fluidized bed.

References Cited

UNITED STATES PATENTS

| | | | |
|---|---|---|---|
| 3,309,262 | 3/1967 | Copeland et al. | 162—30 |
| 3,322,492 | 5/1967 | Flood | 23—46 |

S. LEON BASHORE, Primary Examiner

T. G. SCAVONE, Assistant Examiner

U.S. Cl. X.R.

23—46, 129

PO-1050
(5/69)

UNITED STATES PATENT OFFICE
CERTIFICATE OF CORRECTION

Patent No. 3,523,864     Dated August 11, 1970

Inventor(s) Joseph Osterman and Herbert E. Klei, Jr.

It is certified that error appears in the above-identified patent and that said Letters Patent are hereby corrected as shown below:

Column 1, line 13, "systvem" should read --system--.

Column 2, line 46, "rigulated" should read --regulated--.

Column 2, line 70, after "26", "with" should read --and--.

Column 3, line 22, "cycline" should read --cyclone--.

Column 4, line 70, "burned" should read --burner--.

Column 5, line 72, after "NaOH" insert --and $Na_2S$--.

Signed and sealed this 11th day of May 1971.

(SEAL)
Attest:

EDWARD M. FLETCHER, JR.
Attesting Officer

WILLIAM E. SCHUYLER, JR.
Commissioner of Patents